(12) United States Patent  (10) Patent No.: US 8,719,729 B2
Smith et al.  (45) Date of Patent: May 6, 2014

(54) USER INTERFACE FOR A COMPUTING DEVICE

(75) Inventors: Martin R. Smith, Dundee (GB); Michael N. McKenna, Dundee (GB)

(73) Assignee: NCR Corporation, Duluth, GA (US)

( * ) Notice: Subject to any disclaimer, the term of this patent is extended or adjusted under 35 U.S.C. 154(b) by 903 days.

(21) Appl. No.: 12/491,900

(22) Filed: Jun. 25, 2009

(65) Prior Publication Data

US 2010/0333029 A1  Dec. 30, 2010

(51) Int. Cl.
*G06F 3/0482* (2013.01)
(52) U.S. Cl.
USPC ........... 715/834; 715/810; 715/828; 715/811; 715/789
(58) Field of Classification Search
USPC .......................................................... 715/834
See application file for complete search history.

(56) References Cited

U.S. PATENT DOCUMENTS

| | | | | |
|---|---|---|---|---|
| 4,591,054 A * | 5/1986 | Blossom | ...................... | 206/425 |
| 5,798,760 A * | 8/1998 | Vayda et al. | .................. | 715/834 |
| 5,926,178 A * | 7/1999 | Kurtenbach | .................. | 715/834 |
| 6,163,317 A * | 12/2000 | de Judicibus | ................ | 715/853 |
| 6,448,987 B1 * | 9/2002 | Easty et al. | .................... | 715/834 |
| 6,847,387 B2 * | 1/2005 | Roth | ............. | 715/811 |
| 6,925,611 B2 * | 8/2005 | SanGiovanni | ................ | 715/834 |
| 7,036,091 B1 * | 4/2006 | Nguyen | ........................ | 715/834 |
| 7,096,431 B2 * | 8/2006 | Tambata et al. | ............... | 715/834 |
| 7,111,788 B2 * | 9/2006 | Reponen | .................. | 235/472.01 |
| 7,281,218 B1 * | 10/2007 | Runge et al. | .................. | 715/769 |
| 7,412,665 B2 * | 8/2008 | Chitsaz et al. | ................ | 715/826 |
| 7,503,014 B2 * | 3/2009 | Tojo et al. | ...................... | 715/810 |
| 7,728,821 B2 * | 6/2010 | Hillis et al. | ................... | 345/173 |
| 7,802,197 B2 * | 9/2010 | Lew et al. | ...................... | 715/789 |
| 7,812,824 B2 * | 10/2010 | Im et al. | ........................ | 345/173 |
| 7,979,810 B2 * | 7/2011 | Cho | .............. | 715/864 |
| 7,996,788 B2 * | 8/2011 | Carmichael | ................... | 715/834 |
| 8,028,250 B2 * | 9/2011 | Vronay et al. | ................. | 715/853 |
| 2003/0169299 A1 * | 9/2003 | Kusano et al. | ................. | 345/810 |
| 2003/0212585 A1 * | 11/2003 | Kyoya et al. | ...................... | 705/7 |
| 2004/0250217 A1 * | 12/2004 | Tojo et al. | ...................... | 715/810 |
| 2005/0010952 A1 * | 1/2005 | Gleissner et al. | ............... | 725/46 |
| 2005/0044508 A1 * | 2/2005 | Stockton | ....................... | 715/811 |
| 2005/0081164 A1 * | 4/2005 | Hama et al. | ..................... | 715/830 |
| 2006/0095865 A1 * | 5/2006 | Rostom | .......................... | 715/810 |
| 2007/0094597 A1 * | 4/2007 | Rostom | .......................... | 715/700 |
| 2007/0152981 A1 * | 7/2007 | Im et al. | ........................ | 345/173 |
| 2007/0180392 A1 * | 8/2007 | Russo | ............................ | 715/765 |
| 2007/0236475 A1 * | 10/2007 | Wherry | .......................... | 345/173 |

(Continued)

*Primary Examiner* — William Bashore
*Assistant Examiner* — Reza Nabi
(74) *Attorney, Agent, or Firm* — Joseph P. Merhle

(57) ABSTRACT

A computing device including a graphical user interface is described. The computing device comprises: a display; a display controller; and a graphical user interface controller. The graphical user interface controller is arranged to create a first and second cluster of associated menu options. The first cluster of associated menu options comprises: a first principal menu option and at least one first sub-ordinate menu option, smaller than the first principal menu option, and located on the periphery of the first principal menu option. The second cluster of associated menu options comprises: a second principal menu option and at least one second sub-ordinate menu option smaller than the second principal menu option, and located on the periphery of the second principal menu option. The graphical user interface controller is also arranged to enable a user (a) to decouple the first sub-ordinate menu option from the first principal menu option and (b) to couple the decoupled the first sub-ordinate menu option to the second principal menu option.

11 Claims, 2 Drawing Sheets

(56) References Cited

U.S. PATENT DOCUMENTS

| | | | |
|---|---|---|---|
| 2007/0261003 A1* | 11/2007 | Reissmueller | 715/810 |
| 2008/0177994 A1* | 7/2008 | Mayer | 713/2 |
| 2008/0307369 A1* | 12/2008 | Liu et al. | 715/855 |
| 2009/0031235 A1* | 1/2009 | Martin et al. | 715/765 |
| 2009/0083665 A1* | 3/2009 | Anttila et al. | 715/834 |
| 2009/0106696 A1* | 4/2009 | Duarte | 715/828 |
| 2009/0228831 A1* | 9/2009 | Wendker et al. | 715/808 |
| 2009/0265247 A1* | 10/2009 | Carroll et al. | 705/15 |
| 2009/0271708 A1* | 10/2009 | Peters et al. | 715/738 |
| 2009/0327955 A1* | 12/2009 | Mouilleseaux et al. | 715/810 |
| 2010/0083180 A1* | 4/2010 | Matsubara et al. | 715/834 |
| 2010/0088618 A1* | 4/2010 | Mayer-Ullmann | 715/763 |
| 2010/0122194 A1* | 5/2010 | Rogers | 715/769 |
| 2010/0138784 A1* | 6/2010 | Colley | 715/810 |
| 2010/0159896 A1* | 6/2010 | Shin et al. | 455/414.1 |
| 2010/0287468 A1* | 11/2010 | Reifman et al. | 715/702 |
| 2010/0293221 A1* | 11/2010 | Sidman et al. | 709/203 |
| 2010/0333029 A1* | 12/2010 | Smith et al. | 715/834 |
| 2011/0202838 A1* | 8/2011 | Han et al. | 715/702 |
| 2011/0246918 A1* | 10/2011 | Henderson | 715/769 |
| 2011/0265041 A1* | 10/2011 | Ganetakos et al. | 715/834 |
| 2012/0015693 A1* | 1/2012 | Choi et al. | 455/566 |

* cited by examiner

USER INTERFACE FOR A COMPUTING DEVICE

FIELD OF INVENTION

The present invention relates to an improved user interface for a computing device.

BACKGROUND OF INVENTION

User interfaces are commonly used on general purpose computing devices to allow a user to launch applications, store data, create files, and the like. With the increasing processing power and interconnectivity of computing devices, user interfaces have to provide a large number of options to a user. This can make user interfaces difficult to use, particularly on devices with a small display size, such as a cellular radiofrequency telephone (hereafter "cellphone"), or a portable digital assistant (PDA).

It would be advantageous to provide an improved user interface.

SUMMARY OF INVENTION

Accordingly, the invention generally provides methods, apparatus, systems, and software for an improved user interface.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a graphical user interface for a computing device, the graphical user interface comprising: a first principal menu option having a first size defined by a periphery of the first principal menu option; at least one first sub-ordinate menu option having a size defined by a periphery of the first sub-ordinate menu option, the first sub-ordinate menu option size being smaller than the first principal menu option size, and the first sub-ordinate menu option being located in the vicinity of the periphery of the first principal menu option and associated therewith; a second principal menu option having a size defined by a periphery of the second principal menu option; at least one second sub-ordinate menu option having a size defined by a periphery of the second sub-ordinate menu option, the second sub-ordinate menu option size being smaller than the second principal menu option, and the second sub-ordinate menu option being located in the vicinity of the periphery of the second principal menu option and associated therewith; wherein the first sub-ordinate menu option is operable to be moved by a user from the first principal menu option to the second principal menu option and thereafter to be located in the vicinity of the periphery of the second principal menu option rather than the first principal menu option and to be associated with the second principal menu option rather than the first principal menu option.

The principal menu options may comprise a shape that is circular, generally circular, a polygon, a square, or irregular in shape.

The principal menu options may have a size larger than an end of a typical finger to facilitate selection via a touch-sensitive panel overlying the computing device. Alternatively, where a stylus or mouse pointer is used to make selections, the principal menu options may have a size smaller than an end of a typical finger.

The sub-ordinate menu options may comprise a shape that is circular, generally circular, a polygon, a square, or irregular in shape.

The sub-ordinate menu options may be located in partially overlapping relationship with their associated principal menu options.

The sub-ordinate menu options may have a size generally similar to that of an end of a typical finger.

The principal menu options may implement a function (for example, launching an application (electronic mail, photograph editing, word processing, or the like), transferring data, or the like), or may only be a label (for example, -multi-media, communication, or the like).

The user interface may provide default principal and sub-ordinate menu options. For example, a principal menu option may implement a media function, a communication function, a text editing function, or the like. The media function may include sub-ordinate menu options such as: video, Webcam, camera, gallery, multi-media messaging, and the like. Similarly, the communication function may include sub-ordinate menu options such as: email, text messaging, multi-media messaging, instant messaging, and the like. It will be appreciated that the same sub-ordinate menu option (for example multi-media messaging) may appear as part of more than one cluster (for example, media and also communications), that is, it may be coupled to more than one principal menu option.

The user interface may monitor usage patterns of a user and create a new principal menu option and new sub-ordinate menu options associated therewith so that functions a user typically performs in association with other functions are automatically linked in the same menu cluster. As used herein, a menu cluster comprises a principal menu option and one or more associated sub-ordinate menu options.

The user interface may include a compatibility component that ascertains how compatible a sub-ordinate menu option is with another menu option so that if a user attempts to couple a sub-ordinate menu option with another menu option and the compatibility component assesses the proposed combination as having a low compatibility score (for example, a camera function being coupled with a calendar entry, such as an appointment), then the user interface may present the sub-ordinate menu option as moving slower than the user's finger or stylus. This will give the appearance of the sub-ordinate menu option being "sticky" or resistant to being coupled to that other menu option, thereby alerting the user to the user interface's assessment that the proposed coupling is not deemed to be compatible. In contrast, if the proposed combination has a high compatibility score (for example, a Web page or electronic mail message being coupled to a calendar entry, such as an appointment) then the user interface may present the sub-ordinate menu option as moving at the same rate as the user's finger or stylus. Alternatively, in the event of a low compatibility score, a the user interface may present a confirmation screen to the user advising that the compatibility is low and asking him/her to confirm that this proposed new combination is desired.

According to a second aspect there is provided a graphical user interface for a computing device, the graphical user interface comprising: a first cluster of associated menu options, the first cluster comprising: a first principal menu option and at least one first sub-ordinate menu option, each first sub-ordinate menu option being smaller than the first principal menu option, and located on the periphery of the first principal menu option; a second cluster of associated menu options, the second cluster comprising: a second principal menu option and at least one second sub-ordinate menu option, each second sub-ordinate menu option being smaller than the second principal menu option, and located on the periphery of the second principal menu option; wherein the first sub-ordinate menu option is operable to be decoupled by a user from the first principal menu option and coupled to the second principal menu option.

According to a third aspect there is provided a computing device including a graphical user interface, the computing device comprising: a display for rendering a graphical user interface; a display controller coupled to the display for rendering graphical images thereon; and a graphical user interface controller adapted (i) to create:
 (a) a first cluster of associated menu options, the first cluster comprising: a first principal menu option and at least one first sub-ordinate menu option, each first sub-ordinate menu option being smaller than the first principal menu option, and located on the periphery of the first principal menu option; and
 (b) a second cluster of associated menu options, the second cluster comprising: a second principal menu option and at least one second sub-ordinate menu option, each second sub-ordinate menu option being smaller than the second principal menu option, and located on the periphery of the second principal menu option; and
(ii) to enable a user
 (a) to decouple the first sub-ordinate menu option from the first principal menu option and
 (b) to couple the decoupled the first sub-ordinate menu option to the second principal menu option.

The computing device may further comprise a touch-sensitive panel mounted in overlapping relationship with the display, and a touch panel controller operable to provide a signal to the display controller indicative of a position on the touch-sensitive panel touched by a user (either via the user's finger or a stylus).

These and other aspects will be apparent from the following specific description, given by way of example, with reference to the accompanying drawings.

DETAILED DESCRIPTION

Figure 1:
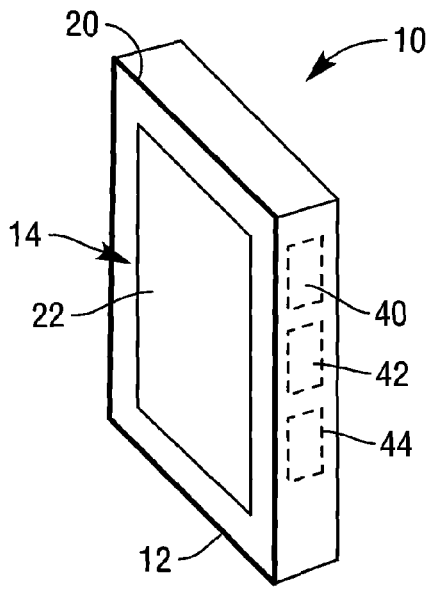
FIG. 1 is a schematic diagram of a portable computing device according to one embodiment of the present invention.

Reference is first made to FIG. 1, which is a simplified front, perspective, schematic diagram of a portable computing device 10 according to one embodiment of the present invention. The device 10 comprises a housing 12 enclosing a display 14 on which is mounted a transparent, touch-sensitive panel 20 in registration with an image area 22 on which graphical elements can be rendered.

Mounted within the housing 12 is a display controller 40, a conventional touch panel controller 42, and a device controller 44. The display controller 40 is arranged for controlling the image area 22 and is responsible for rendering images thereon, in particular, a menu structure providing a graphical user interface.

The touch panel controller 42 is a conventional component that detects a touch on the touch-sensitive panel 20 and conveys the co-ordinates of this touch point to the device controller 44, which updates the display controller 40 as necessary, as will be described in more below.

Figure 2:
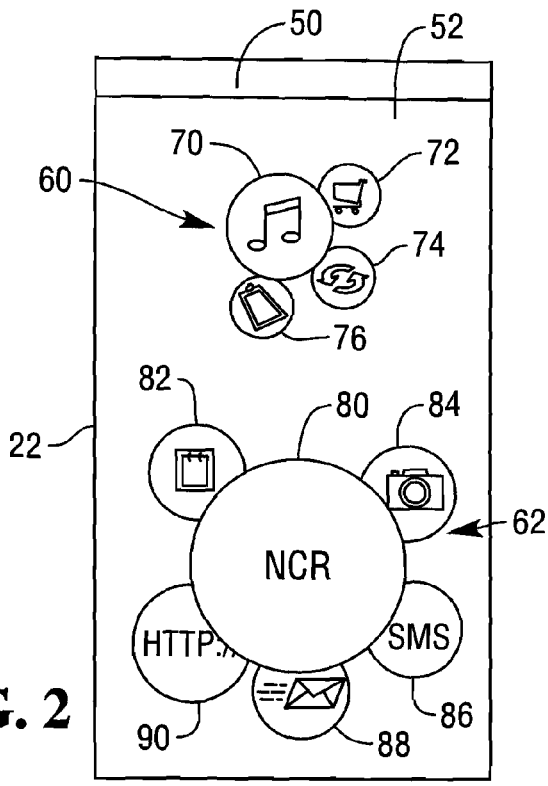
FIG. 2 is a pictorial view of an image area of the device of FIG. 1 showing a first example of a menu structure according to one embodiment of the present invention.
Figure 3:
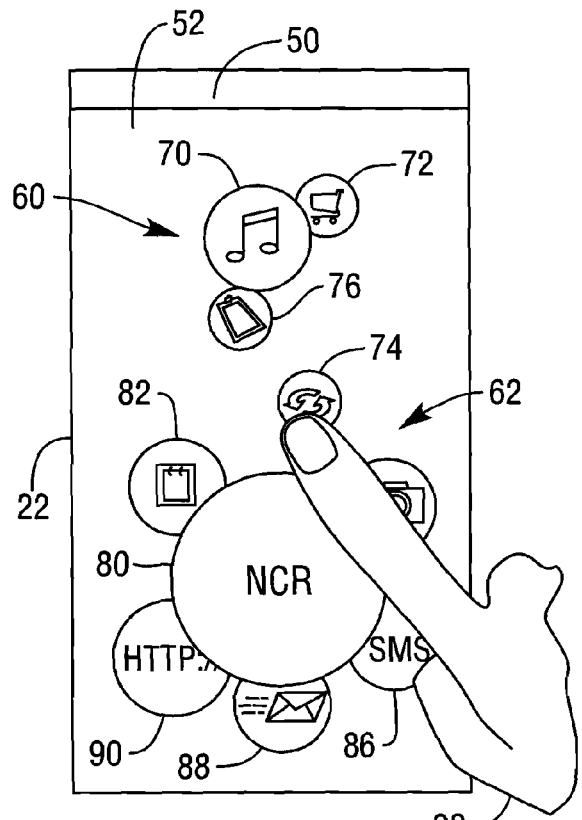
FIG. 3 is a pictorial view of the first example of the menu structure where a user is in the process of manually re-configuring the menu structure.
Figure 4:
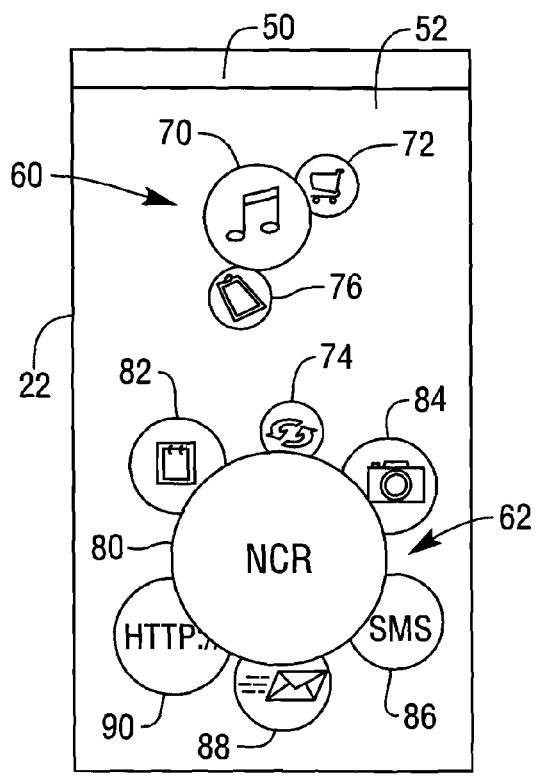
FIG. 4 is a pictorial view of the first example of the menu structure where a user has manually re-configured the menu structure.

Reference will now also be made to FIGS. 2 to 4, which are pictorial views of the image area 22 of the device 10 showing a first example of a menu structure according to one embodiment of the present invention.

The image area 22 comprises a control bar 50 and a working area 52. The control bar 50 displays (not shown) a clock, signal strength of a wireless connection, remaining battery power, and the like. The working area 52 displays two menu clusters 60,62.

The first menu cluster 60 comprises a first principal menu option 70 in the form of a circle having a periphery around which three sub-ordinate menu options 72,74,76 are disposed in overlapping relationship with the principal menu option 70. The sub-ordinate menu options 72,74,76 are all of the same (or similar) size and are substantially smaller than the size of the principal menu option 70.

The first principal menu option 70 provides a media player function, so that selection of this media player menu option 70 launches a media player application.

The three sub-ordinate menu options 72,74,76 comprise, respectively, a purchase option 72 for buying new music or video downloads, a sharing option 74 for transmitting or receiving music or video downloads to or from another device, and an organize option 76 for organizing music and video downloads stored on the device 10 into playlists and libraries.

Similarly, the second menu cluster 62 comprises a second principal menu option 80 in the form of a circle having a periphery around which five sub-ordinate menu options 82,84,86,88,90 are disposed in overlapping relationship with the principal menu option 80. The sub-ordinate menu options 82 to 90 are all of the same (or similar) size and are substantially smaller than the size of the principal menu option 80.

The second principal menu option 80 provides a telephone answer/dial function, so that selection of this telephone menu option 80 answers any incoming phone call, or provides a list of telephone numbers and/or a keypad to enable a user to make a telephone call.

The five sub-ordinate menu options 82,84,86,88,90 comprise: a calendar menu option 82 for opening the user's calendar; a camera menu option 84 for launching a still or video camera application that uses a camera (not shown) provided by the portable computing device 10; a text-messaging application 86; an email application 88; and a Web-browsing application 90.

Although sub-ordinate menu options are clustered around and associated with a principal menu option, they can be decoupled and moved to another principal menu option, as illustrated in FIG. 3, which shows a user's hand 92 moving the sharing option 74 from the media player menu option 70 to the telephone menu option 80.

When the sharing option 74 reaches the telephone menu option 80, as illustrated in FIG. 4, the device controller 44 informs the display controller 40 that the sharing option 74 should now be rendered as part of the second menu cluster 62 instead of as part of the first menu cluster 60, in this example, between the calendar menu option 82 and the camera menu option 84.

Figure 5:
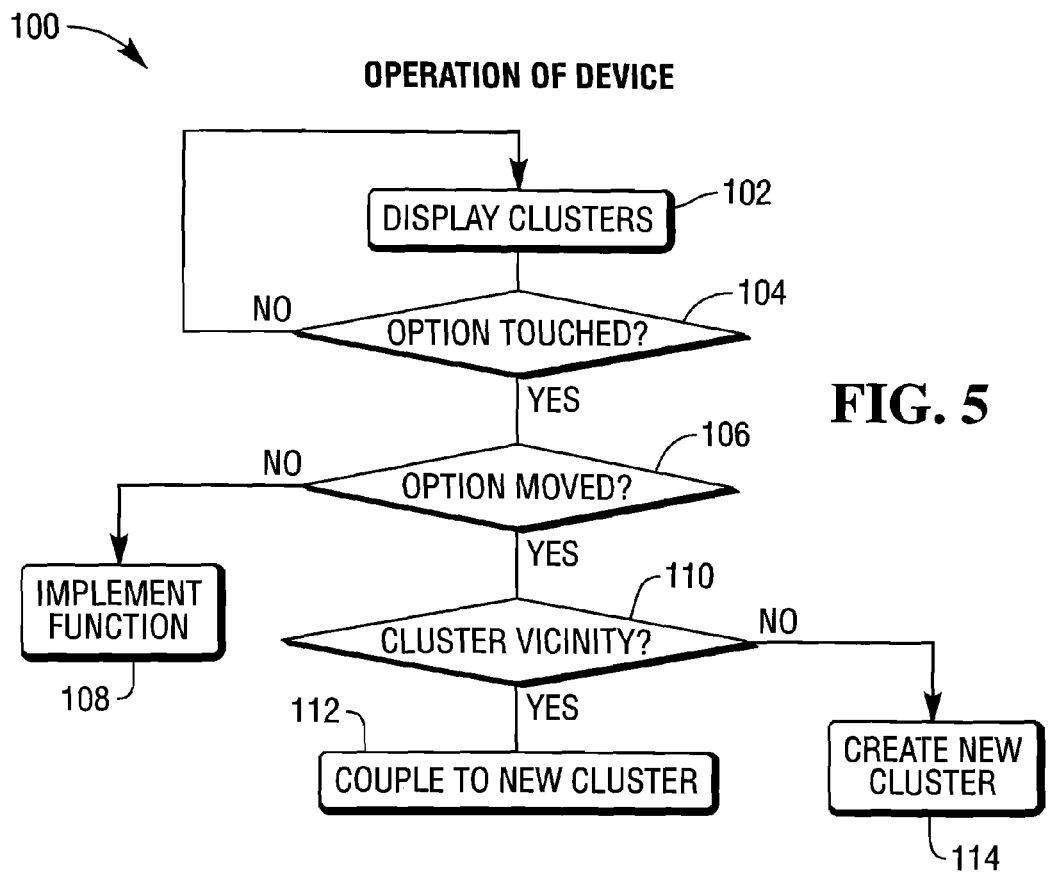
FIG. 5 is a flowchart showing steps involved in reconfiguring the menu structure of FIGS. 2 to 4.

Reference will now also be made to FIG. 5, which is a flowchart 100 showing steps involved in reconfiguring the menu structure of FIGS. 2 to 4.

Initially, the display controller 40 presents the two menu clusters 60,62 on the display 14 (step 102).

The touch panel controller 42 waits until the user of the device 10 touches one of the menu options (step 104), in this example, the sharing option 74. Once a menu option is touched, the device controller 44 ascertains if the user has moved the menu option (sharing option 74) (step 106).

If the user has not moved sharing option 74, then the device controller 44 implements the function associated with the touched menu option (in this example, by launching a file sharing application) when the user lifts the finger or stylus used to select the sharing option 74 (step 108).

If the user has moved the sharing option 74, then the device controller 44 ascertains if the user has moved the sharing option 74 to the vicinity of another cluster (step 110), in this example, the second menu cluster 62.

If the user has moved the sharing option 74 to the vicinity of the second menu cluster 62, then the device controller 44 informs the display controller 42 to couple the sharing option 74 to the second menu cluster 62 (step 112).

If the user has not moved the sharing option 74 to the vicinity of the second menu cluster 62, then the device controller 44 informs the display controller 42 to create a new menu cluster using the moved menu option as a new principal menu option (step 114).

By arranging menu options in clusters, it is possible for a user to create data files as part of a cluster and to operate on those date files by dragging a data file to a menu option. For example, a user may save a digital photograph as a sub-ordinate menu option. The user can then email this digital photograph by dragging the digital photograph to the email application menu option 88, which automatically prepares the digital photograph for sending. Similarly, a music download can be created as a sub-ordinate menu option and transferred to a friend's device by dragging the music download to the sharing menu option 74. Thus, menu options can be used to store data and/or to implement a function.

Figure 6:
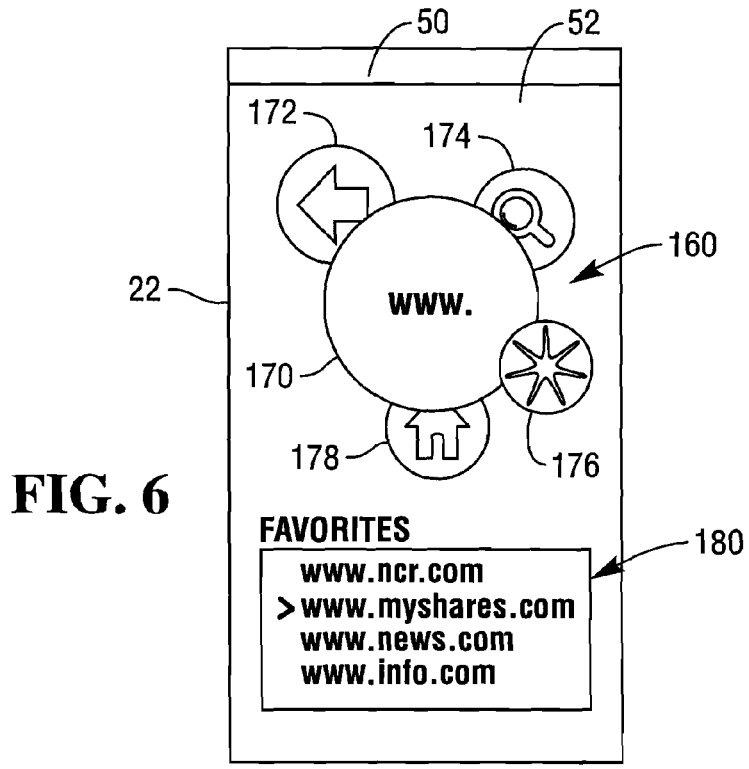
FIG. 6 is a pictorial view of an image area of the device of FIG. 1 showing a second example of a menu structure according to one embodiment of the present invention.

Another example of a menu structure is illustrated in FIG. 6, which is a pictorial view of the image area 22 of the device 10 showing a second example of a menu structure.

The image area 22 comprises the control bar 50 and the working area 52, but the working area 52 now displays one menu clusters 160 and a menu list 180.

The menu cluster 160 comprises a first principal menu option 170 in the form of a circle having a periphery around which four sub-ordinate menu options 172,174,176,178 are disposed in overlapping relationship with the principal menu option 170.

The first principal menu option 170 provides a Web browser function, so that selection of this Web browser menu option 170 launches a Web browser application.

The four sub-ordinate menu options 172,174,176,178 comprise, respectively, a back page option 172 for returning to the previous Web page visited, a search option 174 for launching a Web search page, a favorites option 176 for opening the menu list 180 shown, and a home option 178 for opening a Web pane at the user's home page.

The menu list 180 shows URLs for different Web pages saved by the user in the user's favorites list. The URLs may be listed in the order of most recently accessed, most frequently accessed, an order pre-selected by the user, or the like.

It will now be appreciated that the above embodiment has the advantage of providing a user-friendly, ergonomic, and intuitive user-interface for a computing device.

Various modifications may be made to the above described embodiment within the scope of the invention, for example, in other embodiments, a greater or smaller number of clusters than two may be presented on a display.

In other embodiments, the device controller 44 may include a usage monitor component (not shown) which monitors usage patterns of a user and creates a new principal menu option and new sub-ordinate menu options associated therewith so that functions a user typically performs in association with other functions are automatically linked in the same menu cluster. Alternatively, or additionally, the usage monitor component may group in a single cluster functions that are performed most frequently by a user.

Where multiple users share the same device, the usage monitor component may track and create different menu options for each user of the device.

In the above embodiment, the menu options are all circular, in other embodiments, the menu options may have a different shape, such as generally circular, a polygon, a square, a star, an irregular shape, or any other convenient or aesthetic appearance.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. A computing device including a graphical user interface, the computing device comprising:
  a display for rendering a graphical user interface;
  a display controller coupled to the display for rendering graphical images thereon; and
  a graphical user interface controller adapted
  (i) to create:
  (a) a first cluster of associated menu options, the first cluster comprising:
    a first principal menu option and at least one first sub-ordinate menu option, each first sub-ordinate menu option being smaller than the first principal menu option, and located on the periphery of the first principal menu option; and
  (b) a second cluster of associated menu options, the second cluster comprising:
    a second principal menu option and at least one second sub-ordinate menu option, each second sub-ordinate menu option being smaller than the second principal menu option, and located on the periphery of the second principal menu option;

(ii) to enable a user to
(a) decouple the first sub-ordinate menu option from the first principal menu option and
(b) couple the decoupled first sub-ordinate menu option to the second principal menu option; and
(iii) to resolve compatibility of the decoupled first sub-ordinate menu option to
(a) ascertain a compatibility of the decoupled first sub-ordinate menu option to the second principal menu option, and
(b) alter a rate of presentation on the display depicting movement of the first sub-ordinate menu option from the first principal menu option to the second principal menu option based on the ascertained compatibility, the rate of presentation moves slower than the user's figure or stylus when the coupling of the first sub-ordinate menu option is not deemed to be compatible with the second principal menu option and the rate of presentation moves normally when the coupling of the first sub-ordinate menu option is deemed compatible with the second principal menu option.

2. A computing device according to claim 1, further comprising:
a touch-sensitive panel mounted in overlapping relationship with the display, and
a touch panel controller operable to provide a signal to the display controller indicative of a position on the touch-sensitive panel touched by a user.

3. A computing device according to claim 1, wherein the graphical user interface controller further comprises:
a usage monitor component arranged to monitor usage patterns of a user arid create a new principal menu option and new sub-ordinate menu options associated therewith so that functions a user typically performs in association with other functions are automatically linked in the same menu cluster.

4. A computing device according to claim 1, wherein the computing device further comprises a touch-sensitive panel overlying the display and in registration therewith.

5. A graphical user interface for a computing device, the graphical user interface comprising:
a display having screens comprises:
a first principal menu option having a first size defined by a periphery of the first principal menu option;
at least one first sub-ordinate menu option having a size defined by a periphery of the first sub-ordinate menu option, the first sub-ordinate menu option size being smaller than the first principal menu option size, and the first sub-ordinate menu option being located in the vicinity, of the periphery of the first principal menu option and associated therewith;
a second principal menu option having a size defined by a periphery of the second principal menu option;
at least one second sub-ordinate menu option having a size defined by a periphery of the second sub-ordinate menu option, the second sub-ordinate menu option size being smaller than the second principal menu option, and the second sub-ordinate menu option being located in the vicinity of the periphery of the second principal menu option and associated therewith;
wherein the first sub-ordinate menu option is operable to be moved by a user t?om the first principal menu option to the second principal menu option and thereafter to be located in the vicinity of the periphery of the second principal menu option rather than the first principal menu option and to be associated with the second principal menu option rather than the first principal menu option, and wherein graphical user interface further includes a new principal menu option and a new sub-ordinate menu option for the new principal menu option automatically linking functions a user typically performs in association with other functions within a same menu cluster,
wherein the sub-ordinate menu options are located in partially overlapping relationship with their associated principal menu options.

6. A graphical user interface according to claim 5, wherein the principal menu options comprise a shape that is generally circular.

7. A graphical user interface according to claim 6, wherein the principal menu options have a size larger than an end of a typical user's finger to facilitate selection via a touch-sensitive panel overlying the computing device.

8. A graphical user interface according to claim 5, wherein the sub-ordinate menu options comprise a shape that is generally circular.

9. A graphical user interface according to claim 5, wherein the sub\-ordinate menu options have a size generally similar to that of an end of a typical user's finger.

10. A graphical user interface according to claim 5, wherein the principal menu options implement a function on selection thereof by a user.

11. A graphical user interface according to claim 5, wherein the principal menu options comprise a label.

* * * * *